Nov. 18, 1930.  F. G. DIAGO  1,782,256
AEROPLANE
Filed July 20, 1929  2 Sheets-Sheet 1
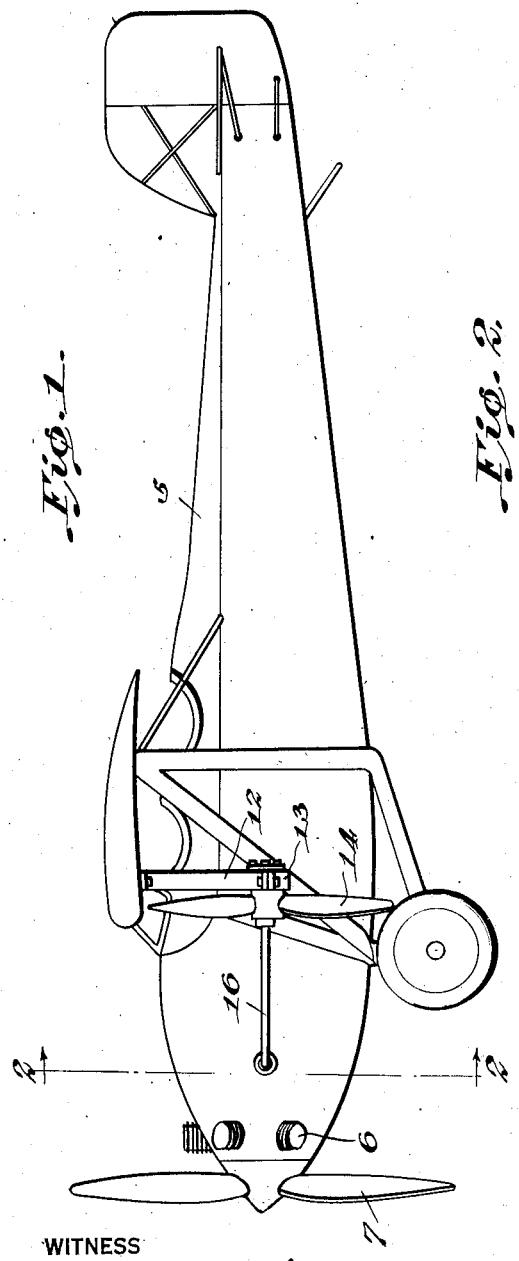
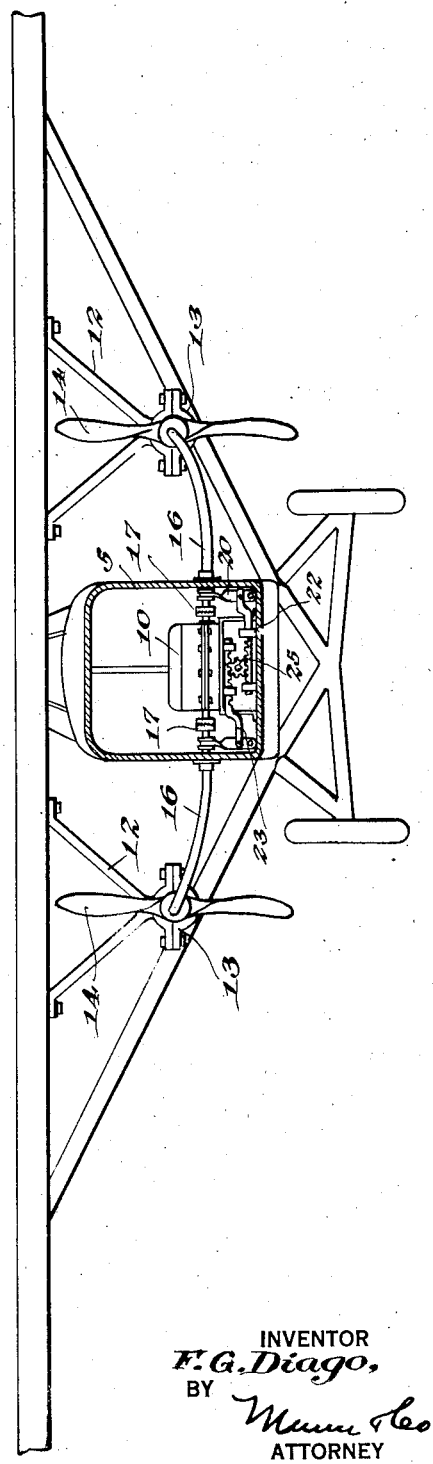
INVENTOR
F. G. Diago,
BY
ATTORNEY Nov. 18, 1930.  F. G. DIAGO  1,782,256
AEROPLANE
Filed July 20, 1929   2 Sheets-Sheet 2
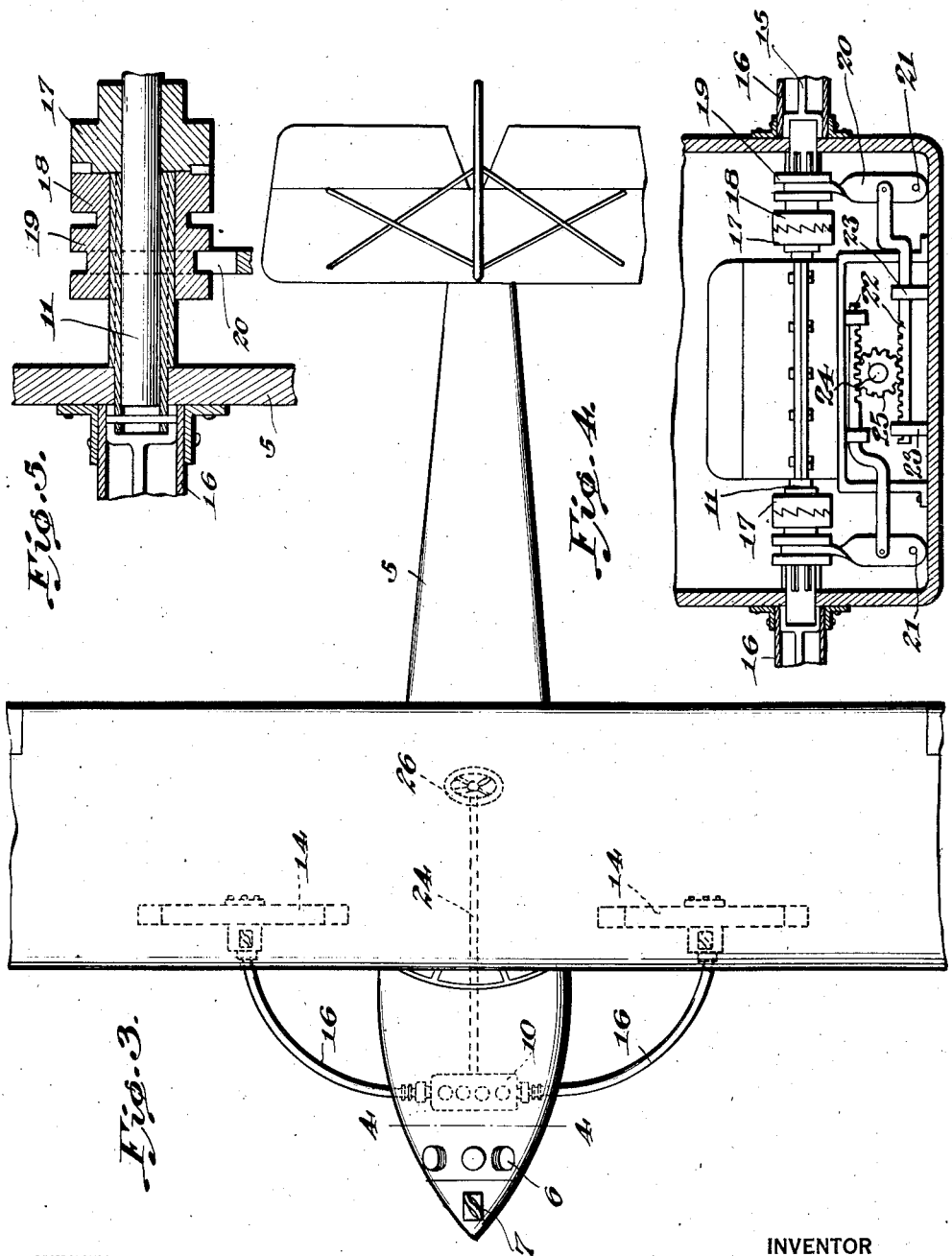
WITNESS
INVENTOR
F. G. Diago
BY
ATTORNEY Patented Nov. 18, 1930

1,782,256

UNITED STATES PATENT OFFICE

FEDERICO GUILLERMO DIAGO, OF HABANA, CUBA

AEROPLANE

Application filed July 20, 1929. Serial No. 379,829.

With aeroplanes equipped with twin motors it is necessary to provide a compensating rudder which subjects the plane to undue strain while it is in flight. Also when one of the motors is idle it drags the plane to one side thus making it necessary to put the compensating rudder into operation to balance the plane, and as above pointed out the plane is subjected to undue strain and incidental danger to the occupants thereof.

With the above objections in mind it is the principal object of the present invention to provide an aeroplane having twin motors which are so arranged and connected with the several propellers as to give the plane perfect balance when one of the motors is idle.

A further object of the invention is to provide an aeroplane having propellers arranged at opposite sides of the fuselage and which are driven from a single motor supported within the fuselage.

The invention also contemplates a manually operable clutch shifting mechanism which is operable to render the propellers at opposite sides of the fuselage operative or inoperative.

With the preceding and other objects and advantages in mind, the invention consists in the novel combination of elements, constructions and arrangements of parts and operations to be hereinafter more fully described, claimed and illustrated in the accompanying drawings, wherein:

Figure 1 is a side elevation of an aeroplane equipped with my invention;

Fig. 2 is a vertical transverse sectional view taken on line 2—2 of Fig. 1;

Fig. 3 is a top plane view of the invention with parts of the wing structure broken away;

Fig. 4 is an enlarged transverse section taken on substantially line 4—4 of Fig. 3; and Fig. 5 is a detail sectional view of parts of the invention.

Referring to the invention in detail a conventional aeroplane 5 equipped with a radial motor 6 at the front end thereof for driving a propeller 7 is provided.

For the purpose of sustaining the aeroplane in place when the motor 6 is inoperative a straight line motor 10 is arranged in the aeroplane fuselage in advance of the aeroplane wing. The motor 10 is arranged with its drive shaft 11 extending transversely of the fuselage and has its ends journalled in the sidewalls of the latter and projecting laterally therefrom.

Brackets 12 depend from the under face of the wing adjacent its forward edge and are provided with bearings 13 in each of which a propeller 14 is journalled for rotation about a horizontal axis. Flexible shafts 15 are fixed to the outer end of the shaft 11 and extend rearwardly from the motor and are connected with the propeller 14. The flexible shafts 15 are incased in tubular housings 16 extending from the outer faces of the side walls of the fuselage to the propellers 14.

In order to control the propellers 14 a clutch mechanism is provided which consists of clutch members 17 fixed to the projecting ends of the shaft 11. For each of the clutch members 17 a slidable clutch member 18 is provided and is keyed to the shaft 11 between the side walls of the fuselage and the clutch members 17. Each of the slidable clutch members 18 is provided with a clutch collar 19 which is engaged by an upstanding bifurcated arm 20 pivotally supported at its lower end in the fuselage as indicated at 21. Parallel rack bars 22 are mounted for longitudinal movement in guides 23 below the shaft 11 and are movable parallel to the latter. The outer end of each of the rack bars is formed with an offset shank 23 which is pivoted to one of the arms 20.

An actuating shaft 24 extends longitudinally of the bottom of the fuselage and carries a gear 25 at its forward end which meshes with the rack bars 22. At its opposite end this shaft 24 carries a hand wheel 26 which is within convenient reach of the operator. It will be observed that upon rotation of the hand wheel the gear 24 will be rotated to move the rack bars towards or away from each other. It follows that when the rack bars are shifted away from each other the arms 20 will be rocked in a direction to slide the clutch members 18 away from the clutch members 17. The reverse movement of the rack bars moves the arms in a direction to engage the clutch members 18 with the clutch members 17 to connect the propellers 14 with the shaft 11 of the engine 10.

What is claimed is:

1. The combination with an aeroplane having a radial motor and a propeller connected thereto, of a straight line motor arranged in the fuselage with its power shaft extending transversely of the latter, clutch members fixed to the ends of the power shaft, cooperating clutch members slidable on such ends of the power shaft, a propeller supported below the wing of the aeroplane at each side of the fuselage, and operative connection between each propeller and corresponding slidable clutch member, parallel rack bars operatively connected with each of the slidable clutch members, a manually operable rotatable shaft in the fuselage and a pinion on one end thereof and engaging the rack bars and operative to engage or disengage the movable clutch members from the fixed clutch members.

2. The combination with an aeroplane having a straight line motor, clutch members fixed to the ends of the power shaft of the motor, cooperating clutch members slidable on the ends of the power shaft, a propeller mounted on the aeroplane at each side of the engine, an operative connection between each propeller and one of the slidable clutch members, parallel rack bars operatively connected with each of the slidable clutch members, a manually operable rotatable shaft mounted in the aeroplane, and a pinion on the shaft and engaging the rack bars and operable to shift the movable clutch members to operative and inoperative position.

3. The combination with an aeroplane having a straight line motor, of a clutch member fixed to one end of the power shaft of the motor, a slidable clutch member on the shaft and having operative connection with the propeller of the aeroplane, a pivotally supported arm engaging the slidable clutch member, a rack bar supported for movement parallel to the motor shaft and having one end pivotally connected with the pivoted arm, and a manually rotatable pinion engaging the rack bar and operative to move the arm on its axis to engage or disengage the slidable clutch member from the fixed clutch member.

FEDERICO GUILLERMO DIAGO.